No. 698,980. Patented Apr. 29, 1902.
J. LÜHNE.
APPARATUS FOR THE MANUFACTURE OF GLASS, &c.
(Application filed Dec. 26, 1899.)
(No Model.)

Witnesses
S. Brashears
Wm. C. Lyddane

Inventor
J. Lühne
by G. Gittman Atty

UNITED STATES PATENT OFFICE.

JOHANN LÜHNE, OF AACHEN, GERMANY.

APPARATUS FOR THE MANUFACTURE OF GLASS, &c.

SPECIFICATION forming part of Letters Patent No. 698,980, dated April 29, 1902.

Application filed December 26, 1899. Serial No. 741,636. (No model.)

*To all whom it may concern:*

Be it known that I, JOHANN LÜHNE, engineer, a subject of the German Emperor, residing at Aachen, Germany, have invented certain new and useful Improvements in the Manufacture of Glass and other Analogous Substances and in Apparatus Therefor; and I do hereby declare the following to be a full, clear, and exact description of the invention, such as will enable others skilled in the art to which it appertains to make and use the same.

This invention relates to the manufacture of glass, and more particularly to the manufacture of fine glass, such as is used for optical purposes, the object of the invention being to provide improved means for manufacturing such glass.

An essential condition for the manufacture of refined glass, particularly of the glass employed in optics, is not only to obtain very pure glass, perfectly colorless and transparent, but also perfect uniformity in the structure of the glass.

The difficulty of obtaining a uniform composition resides in the difference of specific gravity of the different silicates, which tend to deposit themselves in the tank in layers corresponding to their gravity, and thus to cause the production of non-homogenous glass. It is therefore requisite to employ the greatest care during the refining of the product to be obtained and carefully prevent decomposition of the liquid masses.

This invention is intended to meet all such difficulties and overcome such obstacles; and to these ends it consists in the improved construction, arrangement, and combination of parts hereinafter fully described and afterward specifically claimed.

Figure 1:
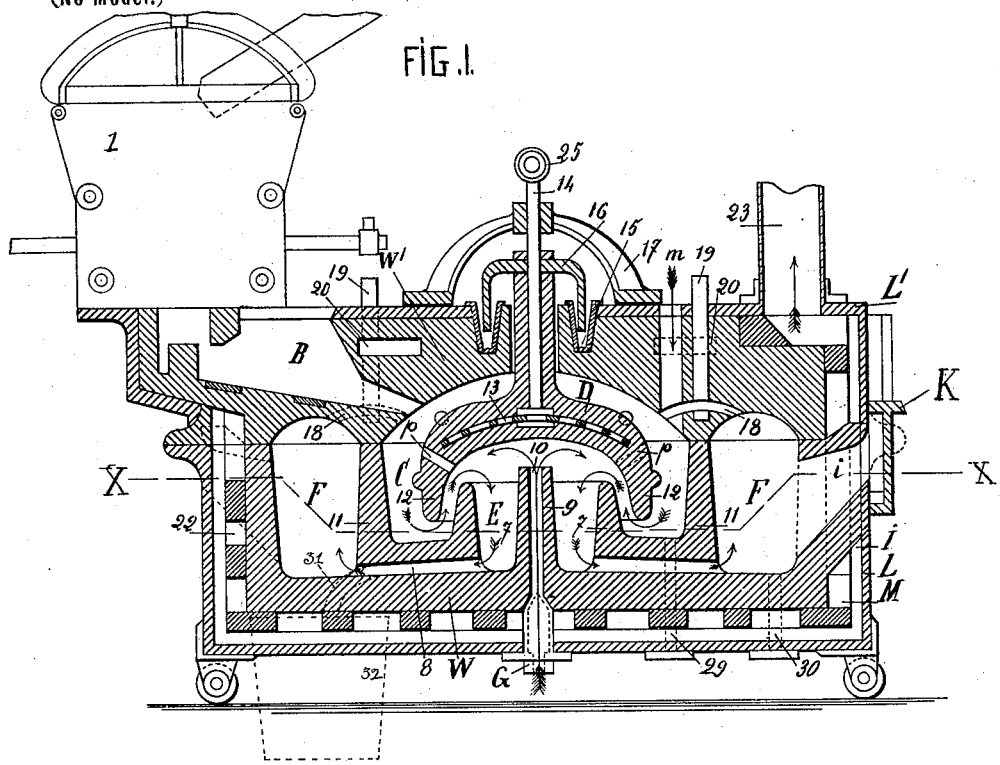
Figure 2:
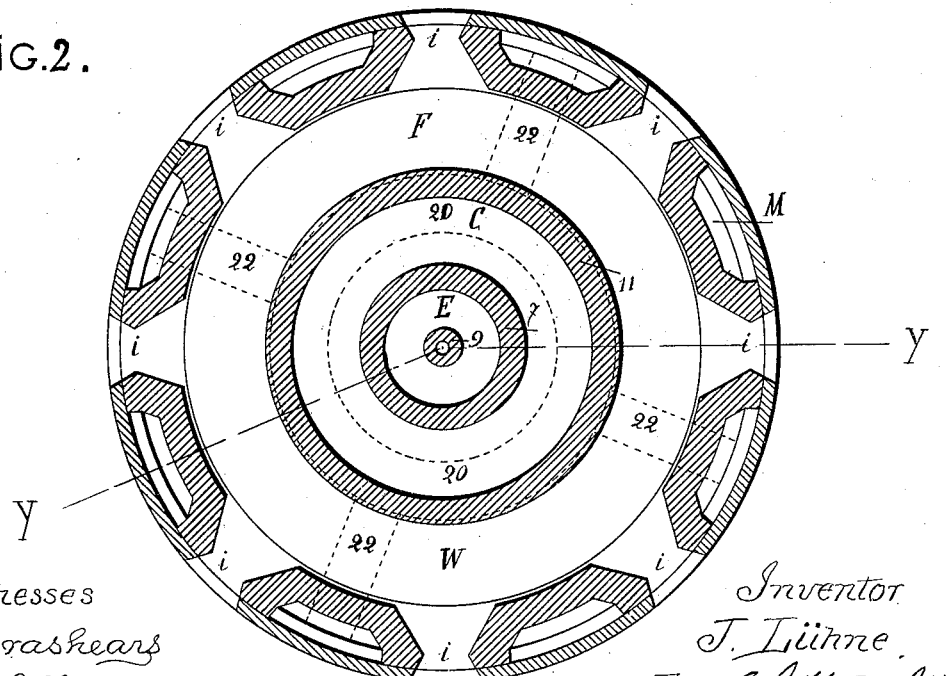

In the accompanying drawings, which illustrate means embodying my invention, Figure 1 is a vertical sectional view of an apparatus constructed in accordance with my invention on the line $y\,y$ of Fig. 2. Fig. 2 is a horizontal section on the broken line $x\,x$ of Fig. 1.

In the apparatus illustrated in Figs. 1 and 2 is provided a receptacle B, above which is located melters 1, from which the melted mass flows into said receptacle B and from there into an annular space C, a bell-shaped mixer D projecting downward into said space C, under the edges of which the molten mass passes, and which mass afterward flows over the inner annular wall 7 of space C into an annular space E, out of which it passes through channels 8 into a large annular space F, from which it may be taken through openings $i$.

While in the space C the mass will be worked by the bell D, which is suspended from a suitable support 25; any suitable arrangement being made whereby the bell may be reciprocated vertically and rotated on its vertical axis like a stirrer or agitator, whereby the liquid mass is kept continually in motion and the separation of its ingredients and their settling in layers according to their specific gravity is prevented, thus also preventing the decomposition of the mass into its separate constituent parts. Even when at rest the bell D could cause with its edge 12, prolonged toward the base, a sharp circulation of the mass passing from the space C into the space E, and thus tends to make it homogeneous.

In addition to the mechanical, regular, and thorough mixing which is essential to assure a good quality of the product to be manufactured, the employment of the bell D also offers a perfect guarantee against the conveyance of impurities from the space C into the space F by forming a siphon-shaped passage under its edge 12.

The solidity of the bell D is assured by the perforated metal center piece 13, which is suspended by the rod 14, the perforations of the piece 13 permitting the joining and bonding of the particles of clay of which the bell is made and which are otherwise separated by the metal center piece. By vertically adjusting the bell the relative positions of edge 12 and wall 7 may be changed to regulate the flow from C to E, and by the withdrawal of the bell the inner parts are accessible. Wear of the edge 12 is also thus compensated for and the passage of floating impurities prevented.

In order to supply oxygen gas to the mass, a pipe 9 is provided projecting upward from tank W centrally into space E. The gas passing through the pipe 9 is uniformly distributed by the bell over the mass in space E, as indicated by the arrows 10, after which it passes through small channels $p$ in the bell into contact with the mass in space C and escapes through channels 18 (provided with valves 19, whereby they may be closed or opened, as desired) into space F in contact with the mass therein.

The spaces C and F may be emptied through channels 29, 30, and 31 (shown in dotted lines in Fig. 1) into a suitable receptacle 32, also shown in dotted lines.

The upper hermetic ceiling of the bell D is assured by a small bell 16, dipping into a circular channel 15, filled with a liquid not easily evaporated. The rod 14 of the bell D is guided in the guide-bar 17.

During the preliminary heating of the furnace, before the molten mass is introduced, the heated gases will pass under the edge 12; but after the mass is introduced it compels these gases to pass through the small channels $p$. The size of these being limited, the gases are somewhat restricted in their passage, thus creating a pressure of gas in space E under the bell D, which facilitates the introduction of oxygen during the working process.

The circular channel 20 is connected with the feed-channel $m$ and with the radially-arranged channels 22, (shown in dotted lines in Fig. 2,) so that while the channel $m$ is closed the waste gases escape through these channels to the outlet 23.

The annular form of the walls 7 and 12 and spaces C, E, and F give greater capacity in a small space than is possible with the same parts if made straight or of other forms.

The process of refining can not only be utilized in electric melting-furnaces, but can be employed in all kinds of gas-furnaces. In such cases the melted mass is introduced through the vertical channel $m$, running into compartment C.

Having thus fully described my invention, what I claim as new, and desire to secure by Letters Patent of the United States, is—

1. In a glass-furnace, provided with an annular space, to contain the liquid mass, the combination therewith of an inverted-bell-shaped stirrer and mixer having its edge in said annular space, and means for vertically reciprocating the bell and rotating it on its vertical axis, substantially as described.

2. In a furnace of the character described, the annular space C, having inner walls 7 surrounding a space E, in combination with the inverted-bell-shaped stirrer D having its lower edge in said space C and below the top of the walls 7, whereby the mass admitted to space C is compelled to pass under the edge of the bell D in order to escape over walls 7, substantially as described.

3. In a furnace of the character described provided with annular space C having inner walls 7 inclosing space E, the combination of the bell-shaped mixer D inverted with its edge in space C below the top of the wall 7, and a central pipe 9 in communication with a gas-supply and discharging under the bell-shaped mixer, substantially as described.

4. In a furnace of the character described, a stirrer or mixer consisting of a suitable rod or support, a perforated metal plate secured to its lower end, and an inverted bell of clay formed on said plate, the clay on the opposite sides of the plate being held together through the openings in the plate, substantially as described.

In testimony whereof I affix my signature in presence of two witnesses.

J. LÜHNE.

Witnesses:
H. REUTERS,
C. E. BRUNDAGE.